United States Patent
Thubert et al.

(10) Patent No.: US 10,721,630 B2
(45) Date of Patent: Jul. 21, 2020

(54) AUTOMATED SENSOR COVERAGE OPTIMIZATION WITH AN ACTUATING WALKER AGENT

(71) Applicant: Cisco Technology, Inc., San Jose, CA (US)

(72) Inventors: Pascal Thubert, La Colle sur Loup (FR); Jean-Philippe Vasseur, Saint Martin d'uriage (FR); Patrick Wetterwald, Mouans Sartoux (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 58 days.

(21) Appl. No.: 15/804,064

(22) Filed: Nov. 6, 2017

(65) Prior Publication Data

US 2019/0141540 A1    May 9, 2019

(51) Int. Cl.
*H04W 16/18* (2009.01)
*G05D 1/02* (2020.01)
*H04Q 9/00* (2006.01)

(52) U.S. Cl.
CPC ............ *H04W 16/18* (2013.01); *G05D 1/028* (2013.01); *G05D 1/0274* (2013.01); *H04Q 9/00* (2013.01); *G05D 1/0227* (2013.01); *G05D 1/0238* (2013.01); *G05D 2201/0207* (2013.01); *H04Q 2209/40* (2013.01); *H04Q 2209/84* (2013.01)

(58) Field of Classification Search
None
See application file for complete search history.

(56) References Cited

U.S. PATENT DOCUMENTS

| 9,436,836 | B2 | 9/2016 | Graf | |
|---|---|---|---|---|
| 9,531,605 | B2* | 12/2016 | Ramachandra | ....... H04L 43/062 |
| 2006/0253570 | A1* | 11/2006 | Biswas | ............... H04L 41/0816 709/224 |
| 2007/0019594 | A1* | 1/2007 | Perumal | ................ H04W 40/24 370/338 |
| 2007/0054670 | A1* | 3/2007 | Kalika | ............... H04N 21/4126 455/446 |

(Continued)

OTHER PUBLICATIONS

Deitel et Al. "Operating Systems, Third Edition" (Year: 2004).*

(Continued)

*Primary Examiner* — Robert M Morlan
(74) *Attorney, Agent, or Firm* — Behmke Innovation Group LLC; Kenneth J. Heywood; Jonathon P. Western

(57) ABSTRACT

In one embodiment, a first actuator in a network of sensors and actuators executes a walker agent configured to adjust an actuation setting of the first actuator. The actuation setting controls an area of coverage of the first actuator when actuated. The executing agent on the first actuator receives one or more sensor measurements from one or more of the sensors that are in communication range of the first actuator. The executing agent also controls, based on the received one or more sensor measurements, the area of coverage of the first actuator by adjusting its actuation setting, in an attempt to optimize coverage of the sensors in the network by the areas of coverage of the actuators. The first actuator unloads the executing walker agent after adjusting the actuation setting of the first actuator and propagates the agent to another one of the actuators in the network for execution.

18 Claims, 15 Drawing Sheets

(56) References Cited

U.S. PATENT DOCUMENTS

| | | | |
|---|---|---|---|
| 2010/0091745 A1* | 4/2010 | Bevan | H04W 24/02 370/338 |
| 2015/0066229 A1 | 3/2015 | Lacroix et al. | |
| 2016/0202227 A1 | 7/2016 | Mathur et al. | |
| 2016/0219805 A1 | 8/2016 | Romney et al. | |

OTHER PUBLICATIONS

Nay, et al., "A Machine Learning Approach to Forecasting Remotely Sensed Vegetation Health", arXiv:1602.06335, 2016, 15 pages, arXiv.org.

* cited by examiner

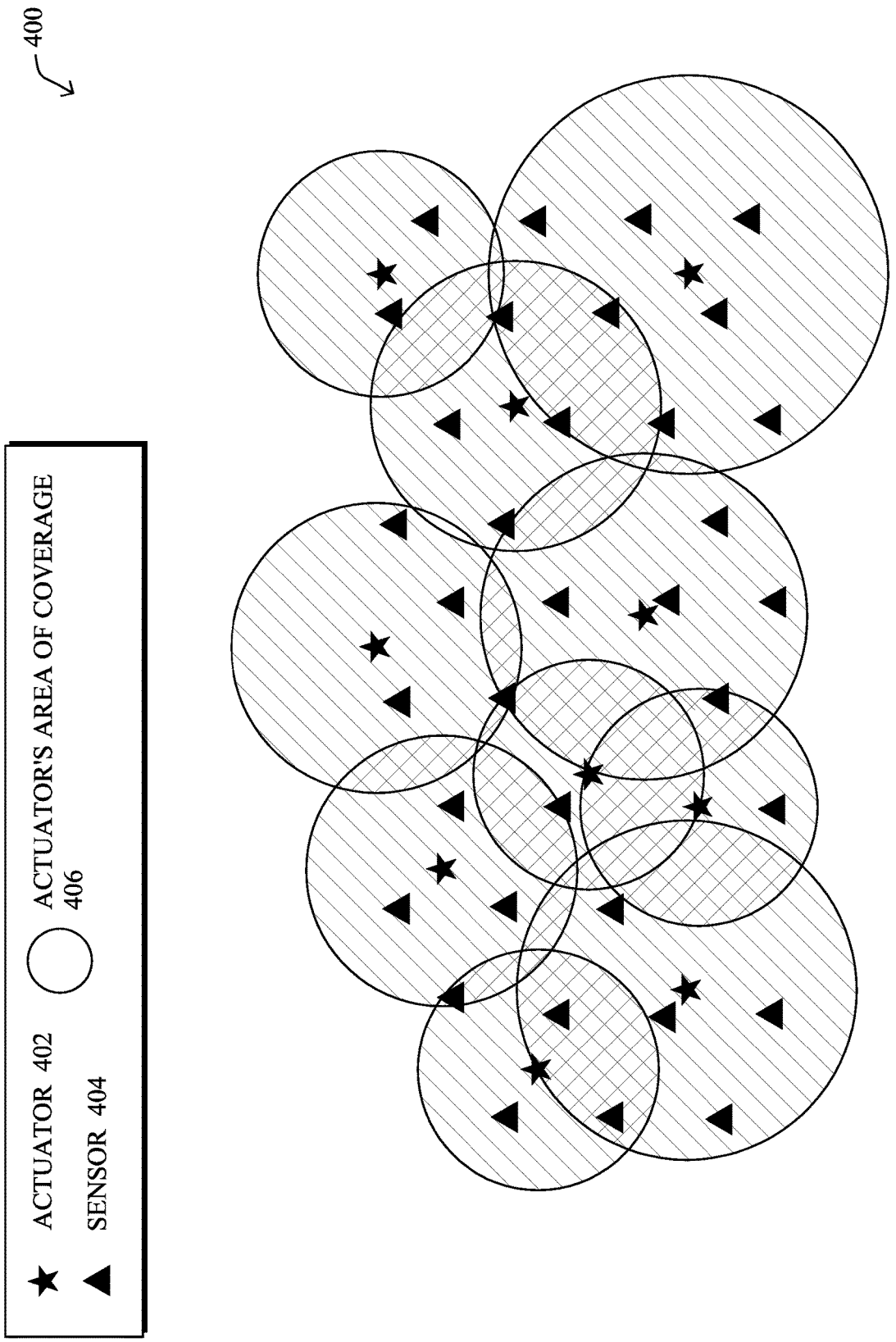

AUTOMATED SENSOR COVERAGE OPTIMIZATION WITH AN ACTUATING WALKER AGENT

TECHNICAL FIELD

The present disclosure relates generally to computer networks, and, more particularly, to automated coverage optimization with an actuating walker agent.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

An example implementation of an LLN is the "Internet of Things" (IoT), which may be used by those in the art to refer to uniquely identifiable objects/things and their virtual representations in a network-based architecture. In particular, the IoT involves the ability to connect more than just computers and communications devices, but rather the ability to connect "objects" in general, such as lights, appliances, vehicles, window shades and blinds, doors, locks, etc. Optimization of the relationships between such objects, though, is often challenging due to the limitations of many LLN devices in terms of memory capacity, duty cycle, etc.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4H illustrate examples of a walker agent optimizing sensor coverage in a network.

DESCRIPTION OF EXAMPLE EMBODIMENTS

Overview

Figure 1:
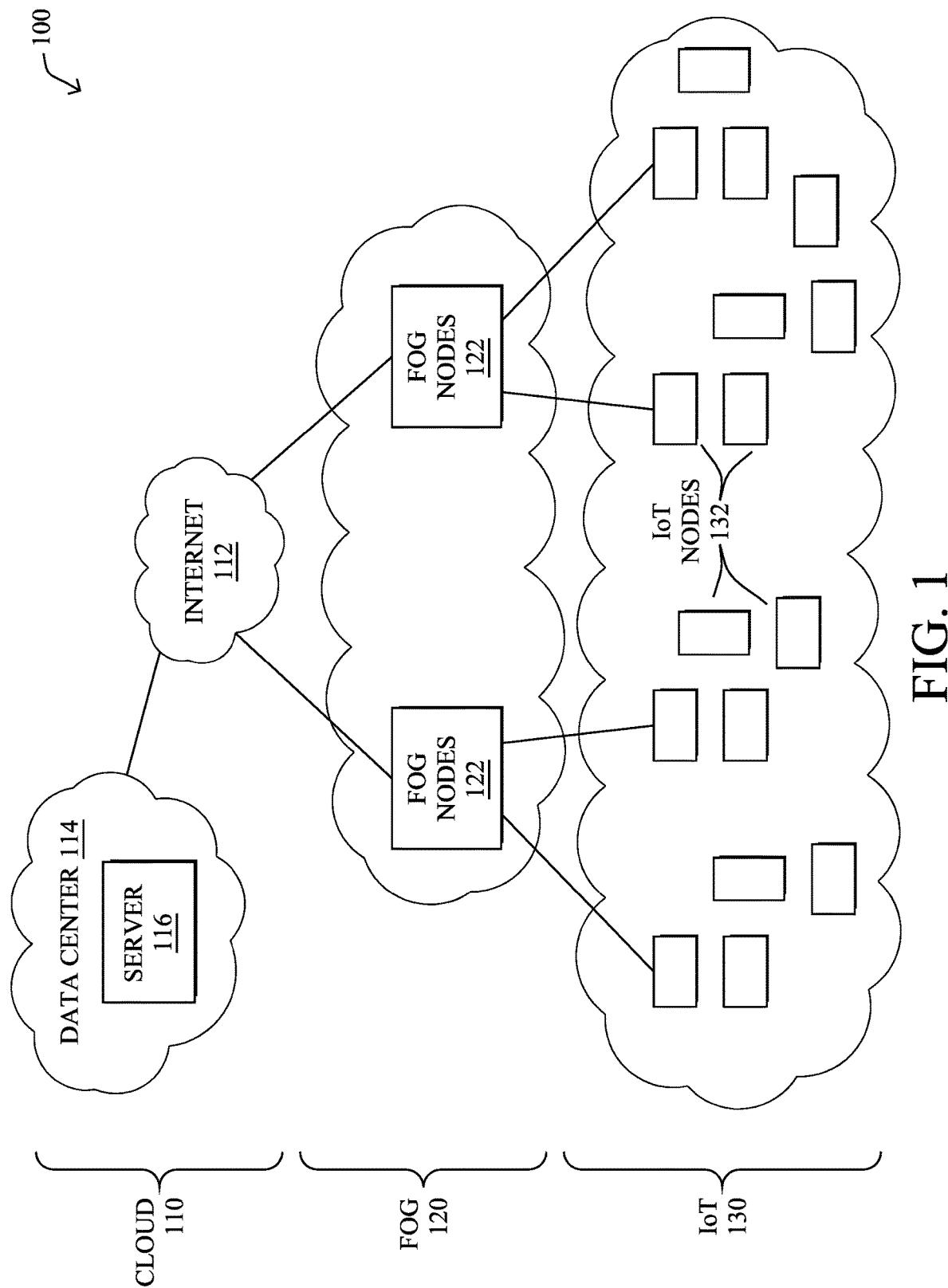
FIG. 1 illustrate an example communication network.

According to one or more embodiments of the disclosure, a first actuator in a network of sensors and actuators executes a walker agent configured to adjust an actuation setting of the first actuator. The actuation setting controls an area of coverage of the first actuator when actuated. The executing agent on the first actuator receives one or more sensor measurements from one or more of the sensors that are in communication range of the first actuator. The executing agent also controls, based on the received one or more sensor measurements, the area of coverage of the first actuator by adjusting its actuation setting, in an attempt to optimize coverage of the sensors in the network by the areas of coverage of the actuators. The first actuator unloads the executing walker agent after adjusting the actuation setting of the first actuator and propagates the agent to another one of the actuators in the network for execution.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
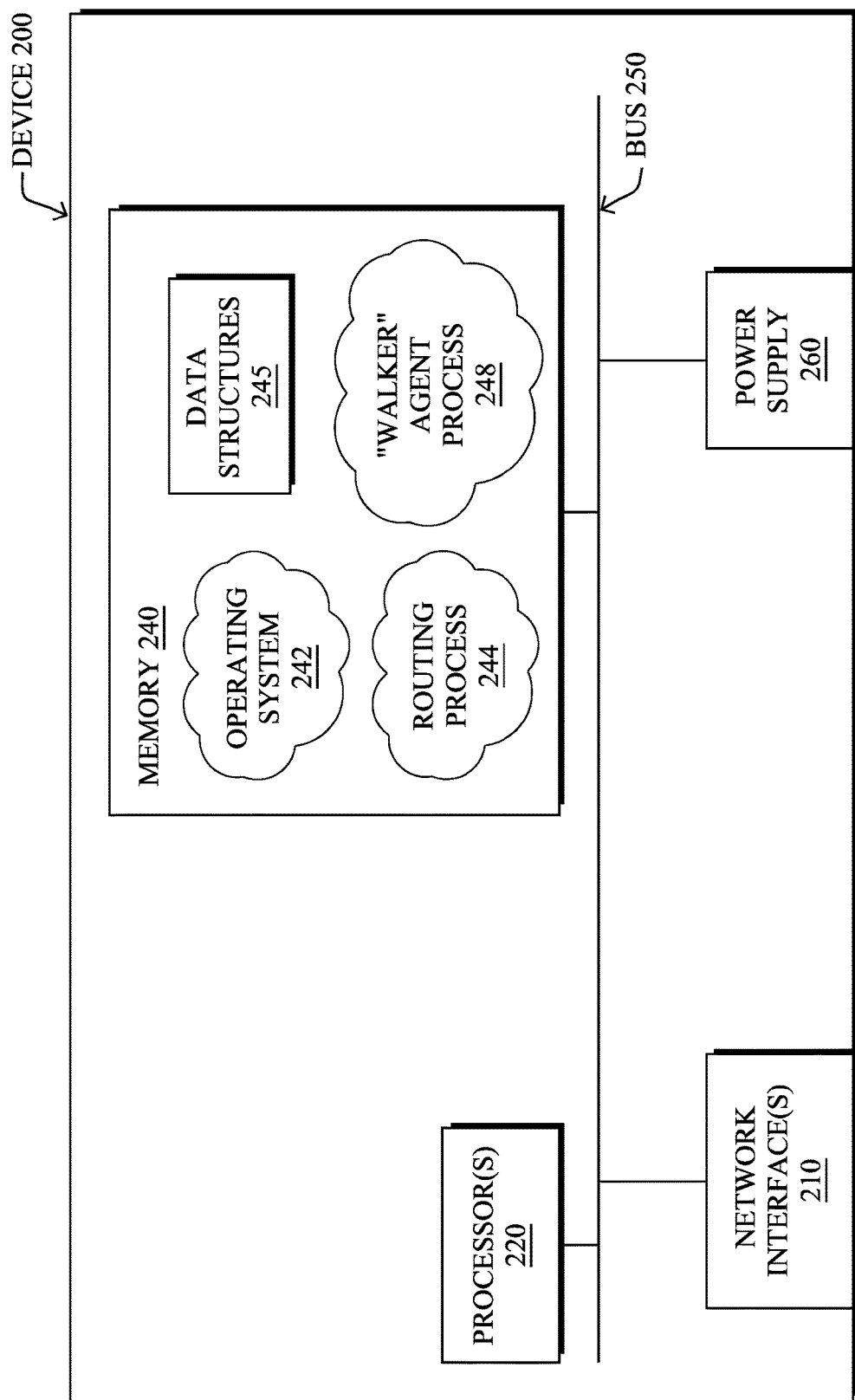
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative "walker" agent process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 include computer executable instructions executed by processor 220 to perform functions provided by one or more routing protocols, such as an Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

Another example protocol that routing process 244 may implement, particularly in the case of LLN mesh networks, is the Routing Protocol for Low Power and Lossy (RPL), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

In various embodiments, device 200 may execute a walker agent process 248. As noted above, many devices/nodes in constrained networks, such as LLNs and the IoT, have very limited resources in terms of available memory, processing power, power source (e.g., battery charge, etc.), and the like. Accordingly, such devices may not be able to locally perform many computationally-intensive tasks. This is particularly true in cases in which the processing device/node is required to maintain state information for multiple devices/nodes in the network.

To address the various limitations of constrained devices in certain networks, existing approaches rely on the deployed devices leveraging a more capable device to perform the computations. For example, the devices in the network could offload the computations to a remote server or cloud-based service outside of the local network. However, doing so also increases the amount of bandwidth consumed to relay the information to and from such a server or service (e.g., via a WAN connection). A more recent evolution proposes the use of the local networking devices, such as edge routers, to perform the computations in the "fog."

According to various embodiments, the concept of a "walker agent," such as walker agent process 248, is introduced herein and offers yet another alternative approach to performing more complex computations in a network of constrained devices/nodes. In general, a walker agent refers to a software agent that loads and executes on a particular device/node in a network, updates state information for its computation during execution, passes both its executable code and updated state information to the next device/node in the network for execution, and then unloads/removes its local copy of the agent. In other words, execution of a walker agent "hops" from one device in the network to the next, while maintaining the state information for its computations during these transfers.

FIGS. 3A-3D illustrate examples of a walker agent being passed from one device/node to another in a network. As shown, consider the case of two devices, device 302a and device 302b, both located in a network 300. In some cases, devices 302a-302b may be neighboring devices having a direct communication link there between. In other cases, devices 302a-302b may be separated by any number of intermediate devices that relay communications between devices 302a-302b.

During operation, device 302a may receive walker agent 304 from another device in the network, such as a neighbor of device 302a, another constrained device along a routing path in the network, or from a supervisory device that provides administrative control over device 302a. In various embodiments, walker agent 304 may comprise executable code 306, as well as state information 308.

Figure 3A:
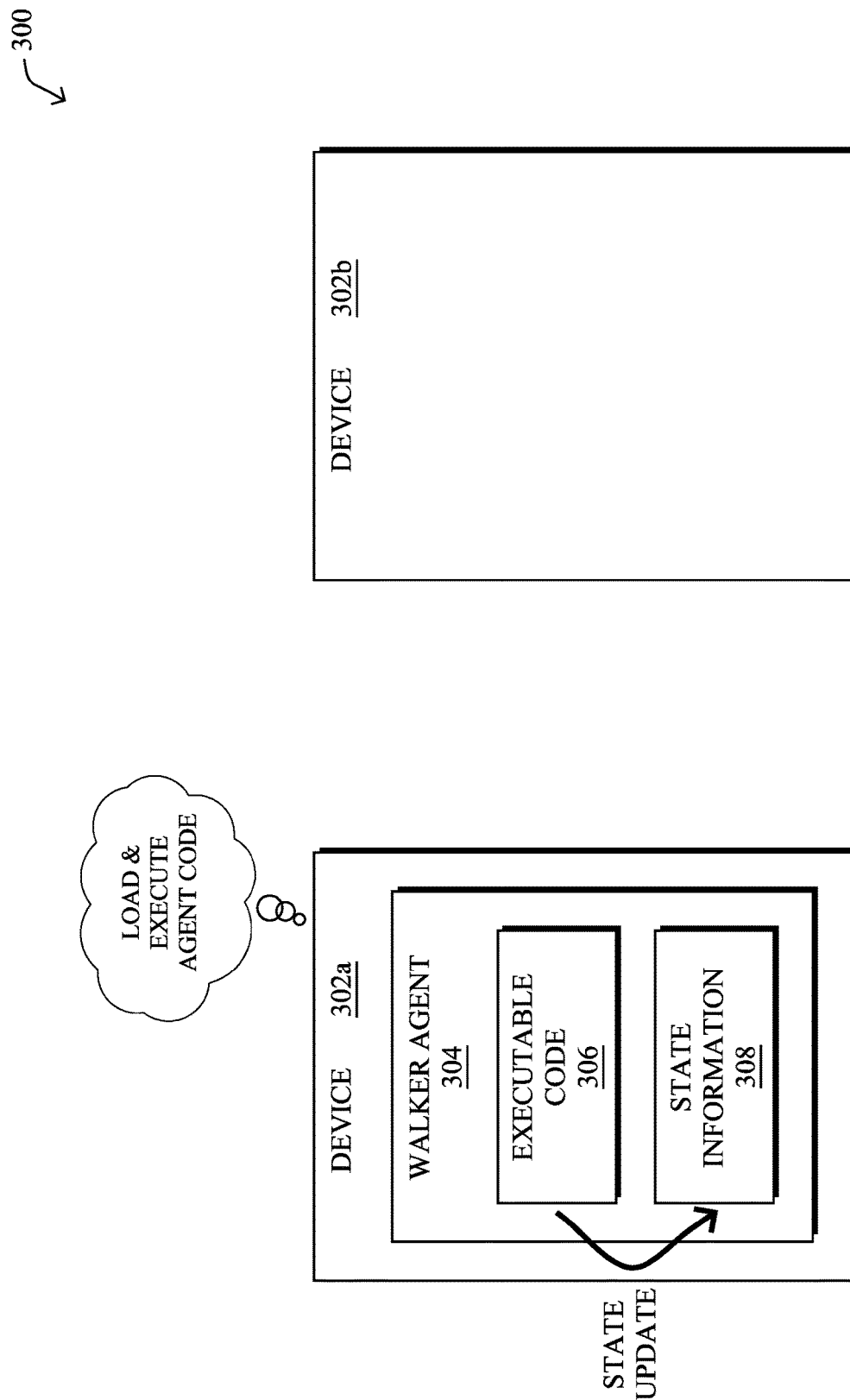
FIGS. 3A-3D illustrate examples of a walker agent being passed from one device/node to another in a network.

As shown in FIG. 3A, device 302a may load executable code 306 which performs a particular computation for which it was configured and updates state information 308, accordingly. Generally, state information 308 may be a set of one or more parameter values that reflect the current state of the computation performed by executable code 306. Such values may be one or more observations about device 302a (e.g., the neighbors of device 302a, the signal strengths to the neighbors, etc.), the portion of network 300 around device 302a, and/or computed values derived therefrom (e.g., averages, statistics, maxima or minima, gradients, etc.).

For example, assume that executable code 306 is configured to calculate an optimal value or running total at each hop or at specific points along a networking path, based on the locally observable value(s) at each device. In such a case, when device 302a receives walker agent 304, it may load and execute executable code 306 of walker agent 304, to retrieve its own locally observable value(s), perform the associated computations on them, and update state information 308, accordingly.

Figure 3B:
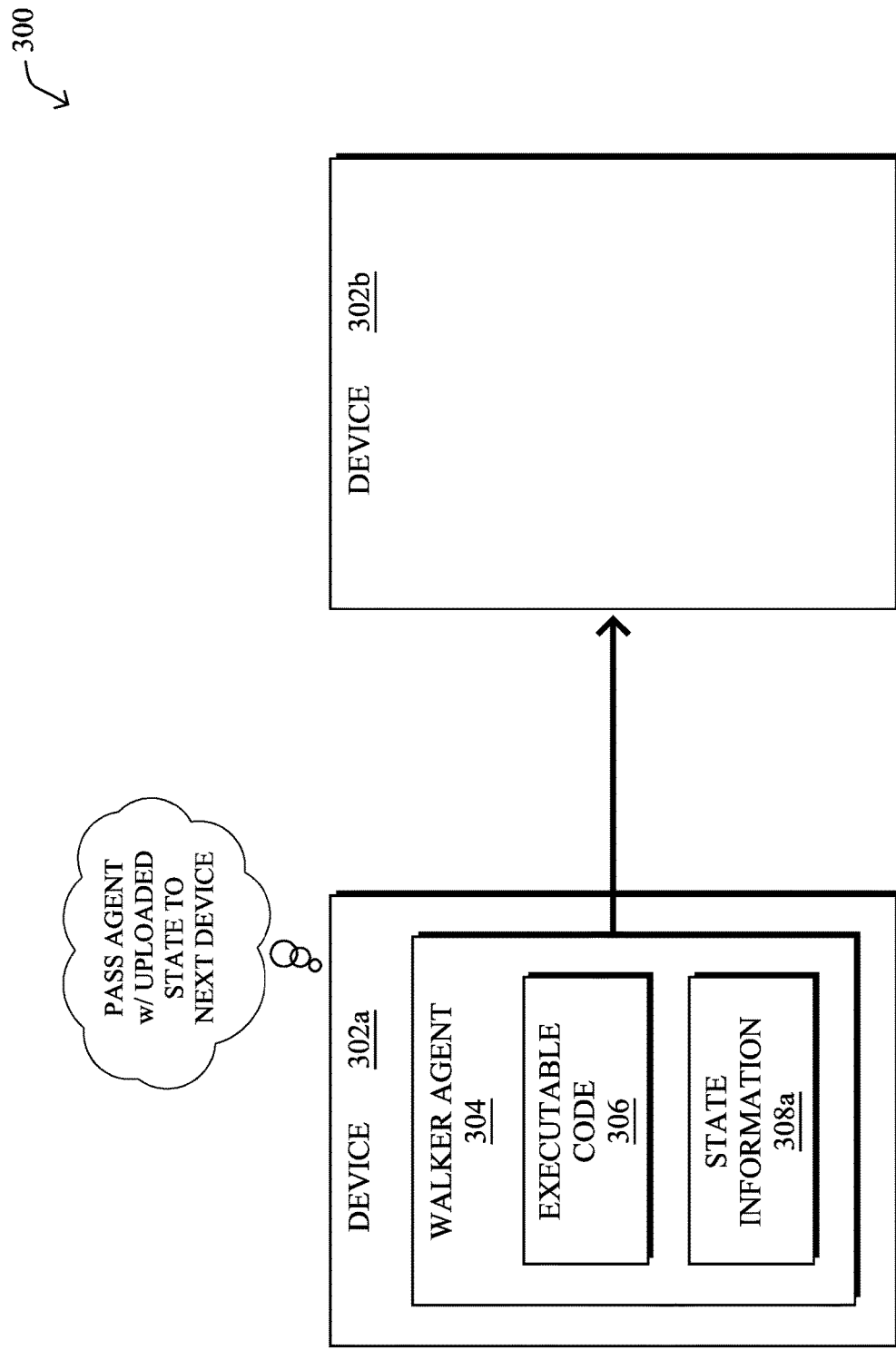
Figure 3C:
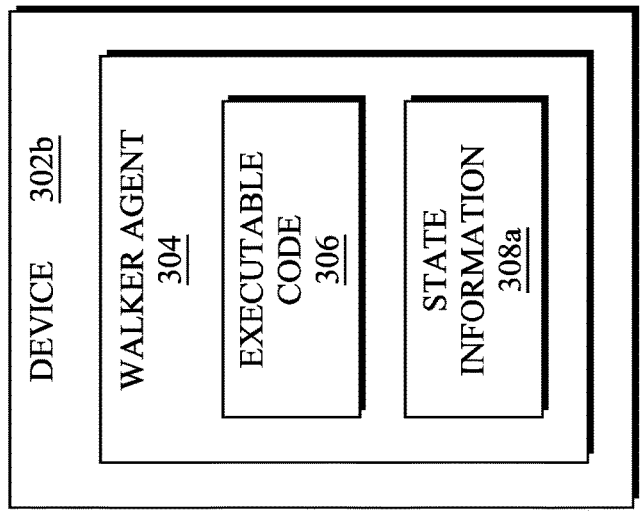
Figure 3C:
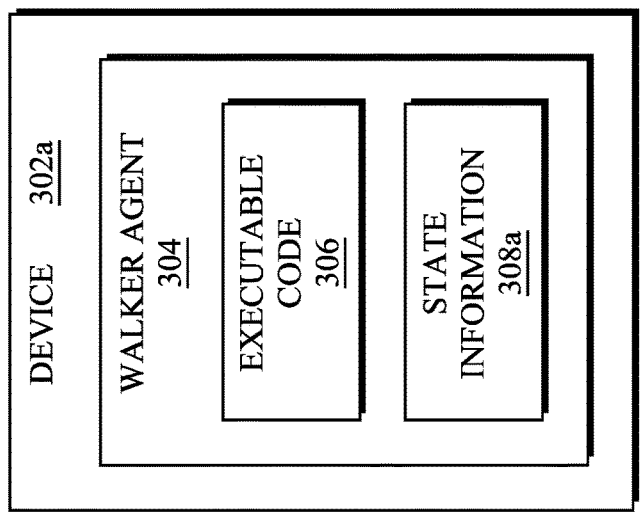

As shown in FIGS. 3B-3C, once device 302a has executed walker agent 304, thereby updating state information 308 into updated state information 308a, device 302a may send walker agent 304 to device 302b. In doing so, when device 302b executes code 306 of walker agent 304, walker agent 304 is able to continue its computation from the point at which it left off on device 302a. In other words, device 302b may then load walker agent 304 and update state information 308a using its own local information. Once completed, device 302b may then send walker agent 304 on to the next device in the network, to repeat the process.

Figure 3D:
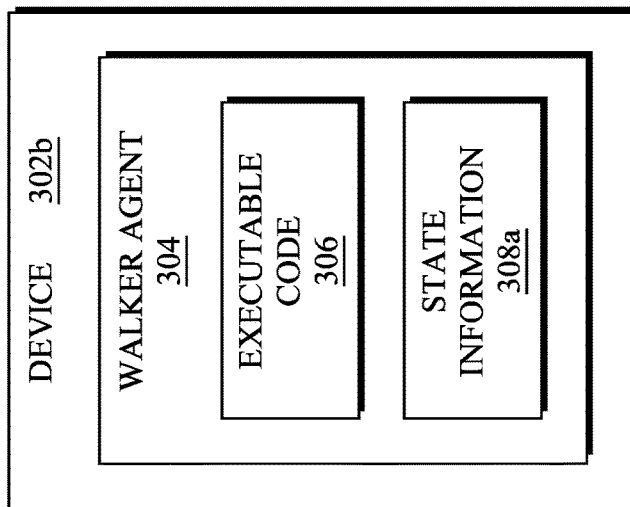
Figure 3D:

In FIG. 3D, another key aspect of a walker agent is that its execution may "hop" from device to device in the network, in various embodiments. Notably, after walker agent 304 has been passed to device 302b, device 302a may unload walker agent 304 from its local system, thereby freeing up resources on device 302a. In some embodiments, this may entail deleting or otherwise removing walker agent 304 from 302a after walker agent 304 has been passed to device 302b for execution. In other words, at any given time, a walker agent may be executed by a subset of one or more devices in the network that changes over the course of time as the executing device(s) complete their computations.

In some embodiments, a walker agent may leverage machine learning, to perform its assigned tasks across the various devices in the network. In general, machine learning is concerned with the design and the development of techniques that receive empirical data as input and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, the walker agent can use the model M to classify new data points, such as information regarding new data points the network. Often, M is a statistical model, and the cost function is inversely proportional to the likelihood of M, given the input data.

Example machine learning techniques that a walker agent can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

As noted above, sensor networks, such as LLNs and IoT networks, may comprise a large number of nodes that collaborate with one another to obtain an overall result (e.g., radio coverage, etc.). Accordingly, node settings (e.g., power levels, etc.) may be adjusted in multiple devices, to achieve this result. However, in many cases, a setting on one device may affect how the settings on other nodes should also be set for purposes of optimizing the network. Particularly in IoT settings, using a centralized approach to managing resources and iteratively adjusting node settings from a remote site across a low-power mesh may be impractical, too slow, and/or energy inefficient.

A powerful application of the concept of a walker agent in a network exists in the field of coverage optimization. Generally, coverage optimization in a network entails adjusting the settings of any number of actuators in a network, in order to maximize or otherwise optimize their coverage over sensors that may be scattered throughout the network. One example of this is the case of IoT radio meshes in which various radios (e.g., actuators) may adjust their settings, to optimize the wireless coverage of other nodes in the mesh. Another example of coverage optimization lies in the case of rotating crop irrigation systems. Here, the coverage optimization may entail adjusting the water pressure of the sprinklers, so as to optimize the distribution of water to the field. In yet another example, security cameras that monitor different locations may be optimized to ensure that the cameras cover the entirety of an area at all times, while preserving the best possible definition in each one. As would be appreciated, many other examples of coverage optimizations exist and the techniques herein are not limited to the above example use cases.

Automated Sensor Coverage Optimization with an Actuating Walker Agent

The techniques herein introduce a software agent that "walks" a network of sensors of actuators, performs measurements, and adjusts the actuation settings of the actuators, as needed, to optimize the coverage of the actuators over the sensors. In some aspects, this may involve the agent changing settings in multiple devices, in a coordinated fashion, and learning from iterative attempts to optimize the coverage. If the setting adjustments performed locally result in the expected coverage, the agent is done with its task. If not, in further aspects, the agent may report its learning back to a central system that performs a global optimization based on all the learning that it receives from the network.

Specifically, according to one or more embodiments of the disclosure as described in detail below, a first actuator in a network of sensors and actuators executes a walker agent configured to adjust an actuation setting of the first actuator. The actuation setting controls an area of coverage of the first actuator when actuated. The executing agent on the first actuator receives one or more sensor measurements from one or more of the sensors that are in communication range of the first actuator. The executing agent also controls, based on the received one or more sensor measurements, the area of coverage of the first actuator by adjusting its actuation setting, in an attempt to optimize coverage of the sensors in the network by the areas of coverage of the actuators. The first actuator unloads the executing walker agent after adjusting the actuation setting of the first actuator and propagates the agent to another one of the actuators in the network for execution.

Illustratively, the techniques described herein may be performed by hardware, software, and/or firmware, such as in accordance with the walker agent process 248, which may include computer executable instructions executed by the processor 220 (or independent processor of interfaces 210) to perform functions relating to the techniques described herein, e.g., in conjunction with routing process 244.

Figure 4A:
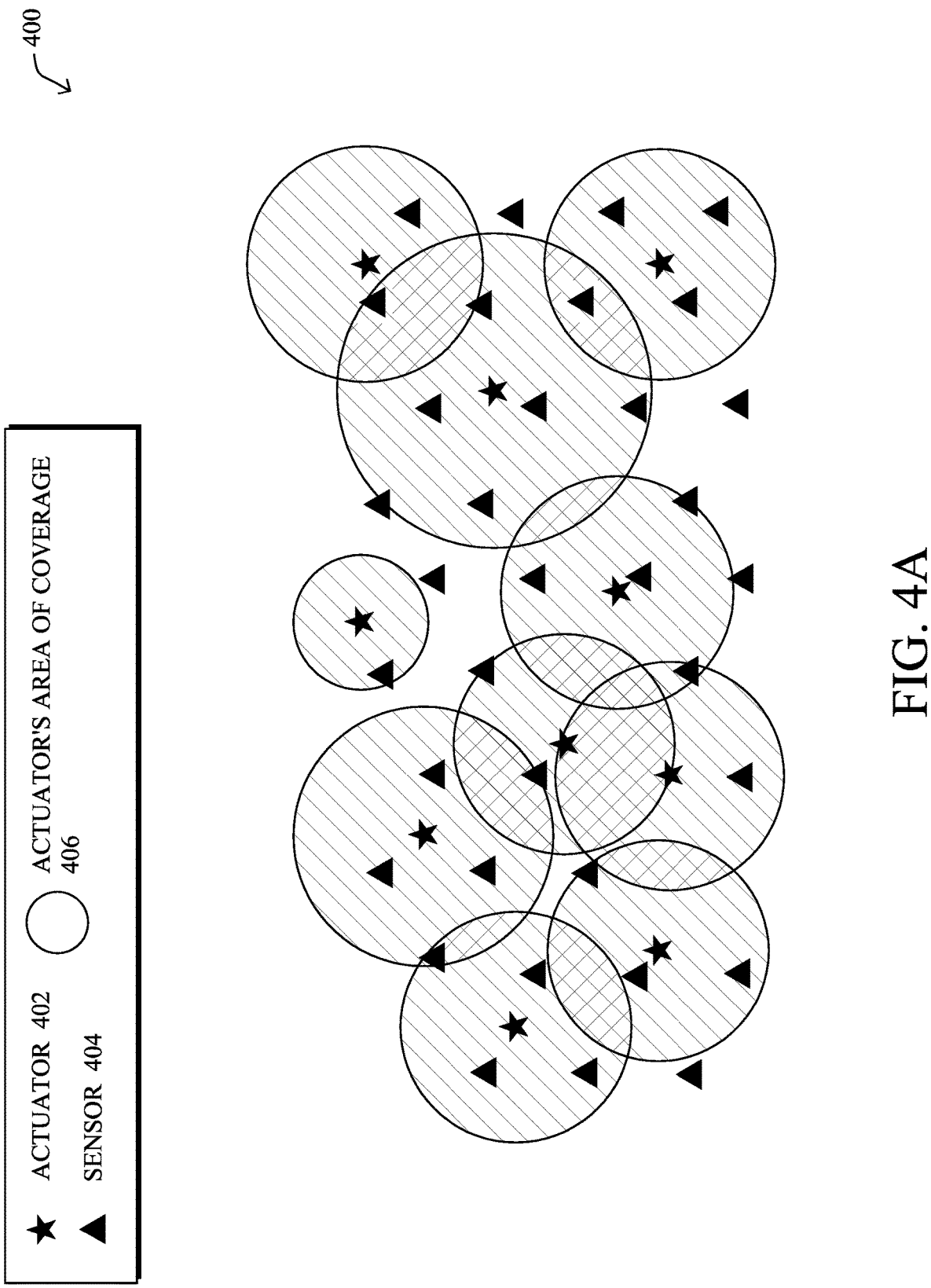

Operationally, FIGS. 4A-4H illustrate examples of a walker agent optimizing sensor coverage in a network, according to various embodiments. As shown in FIG. 4A, assume that a network 400 includes a number of distributed actuators 402 and sensors 404. Each actuator 402 may have an associated area of coverage 406 that represents the physical area affected by actuation of the actuator. For example, if actuators 402 are rotating sprinklers, areas of coverage 406 may likewise represent the physical areas to which the sprinklers deliver water. In another example, actuators 402 may be radios and areas of coverage 406 may represent their corresponding signal ranges.

Regardless of the specific use case, be it sprinklers, radios, or the like, the coverage optimization question remains the same: to what degree should each of the actuators be actuated, to cover the whole area enough, but not too much? To some extent, most networks also include sensors that can be used to assess the coverage by the actuators. These sensors may be particular objects in the area that the cameras must see, moisture sensors in the ground, Wi-SUN meters that need coverage, or the like. Measurements from the sensors can thus be used to control the areas of coverage of the actuators through adjustment of the actuation settings of the actuators. For example, the transmit power of a LoRa gateway radio or Wi-Fi access point, pressure in a sprinkler, focal distance of a camera, or the like, can be adjusted, to change the area of coverage by the actuator.

Figure 4B:
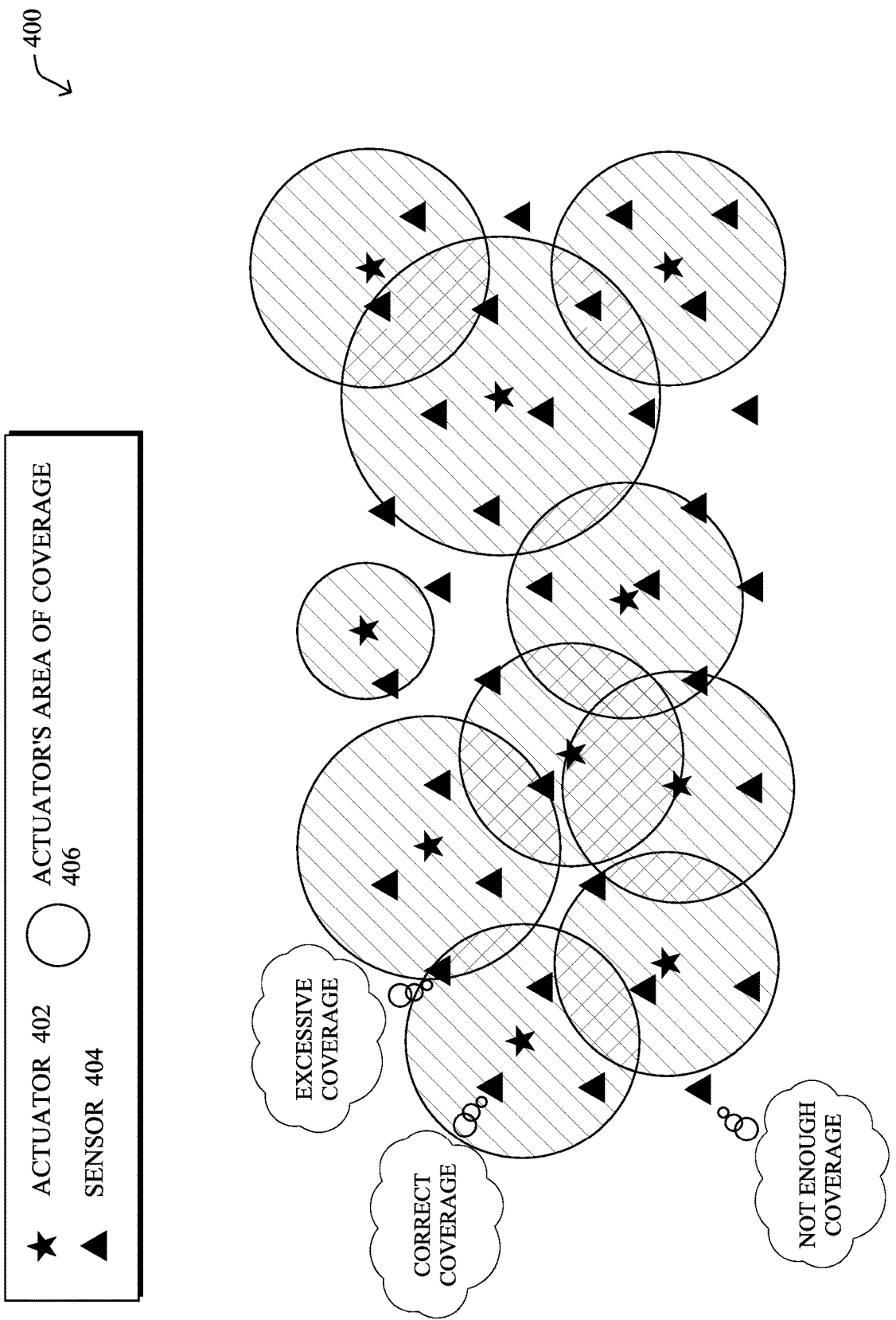

FIG. 4B illustrates the various situations that may occur with respect to areas of coverage 406. As shown, a given sensor 404 may fall within any of the following categories:
- No coverage or not enough coverage—this may occur if the sensor 404 is not within any area of coverage 404 or only partially within an area of coverage 406.
- Excessive coverage—this may occur if the sensor 404 is within the areas of coverage 406 of multiple actuators 402.
- Correct coverage—ideally, the sensor 404 is fully within an area of coverage 406 of a single actuator 402.

Thus, coverage optimization in network 400 may entail, at minimum, rectifying those sensors 404 that have either no coverage or not enough coverage by areas of coverage 406, so that these sensors are also covered. In some cases, the optimization may even go further and attempt to ensure that sensors 404 also do not experience excessive coverage.

According to various embodiments, the techniques herein propose using a walker agent that performs local trial and error on different actuators in network 400 to find local optimizations, learn from the local optimizations, and leverage them to optimize coverage across network 400 or a portion thereof. Generally, the walker agent (e.g., walker agent process 248) is configured to perform two functions: 1.) triggering an actuation by one or more actuators 402 and 2.) performing a reading of the results. For example, the walker agent may use application programming interfaces (APIs) of actuators 402, to adjust the actuation settings of an actuator 402 and control its area of coverage 406 during actuation (e.g., by adjusting a power setting, a pressure setting, etc.). Similarly, as detailed below, the agent may obtain sensor measurements from sensors 404, either locally or from different devices in network 400.

In a collapsed case, only blind actuation by the walker agent is needed, e.g., turn on all the actuators of type A. In that case, the agent may walk the graph of devices and performs the actuation when the hosting device matches this device type. In another embodiment, the walker agent may perform automated optimization by iteratively walking between actuators. For example, the walker agent may first look for a sensor measurement that matches a "not good enough" query, however it may be defined (e.g., low signal quality, insufficient watering, etc.). If that is found, the walker agent may employ a walking pattern among the actuators surrounding the sensor exhibiting this condition and attempt to optimize coverage over this sensor. For example, at each of these actuators, the executing agent may spawn children processes for execution by the nearby sensors that could be covered by that actuator, to obtain readings regarding the coverage areas of the walked actuators.

Figure 4C:
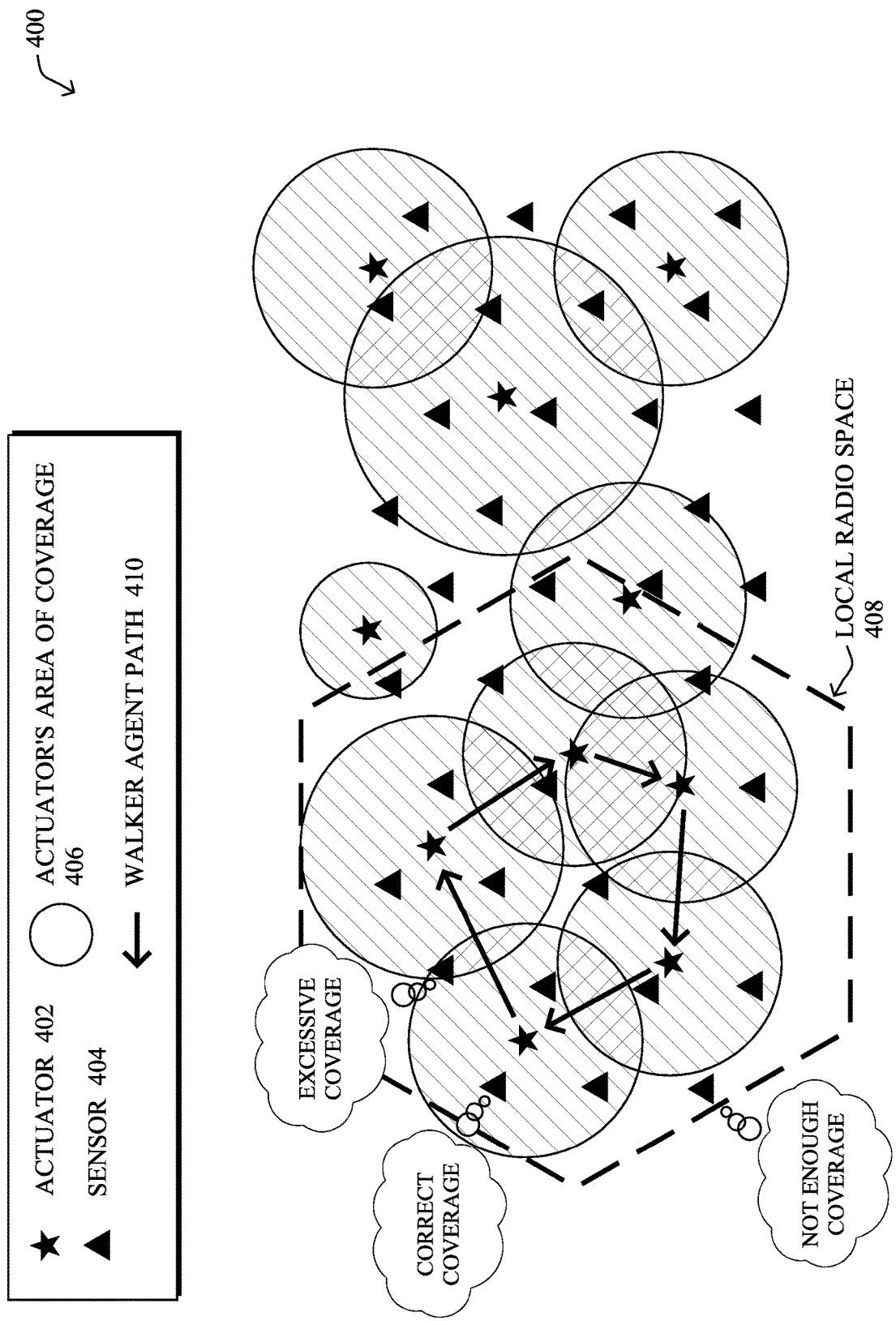
Figure 4D:
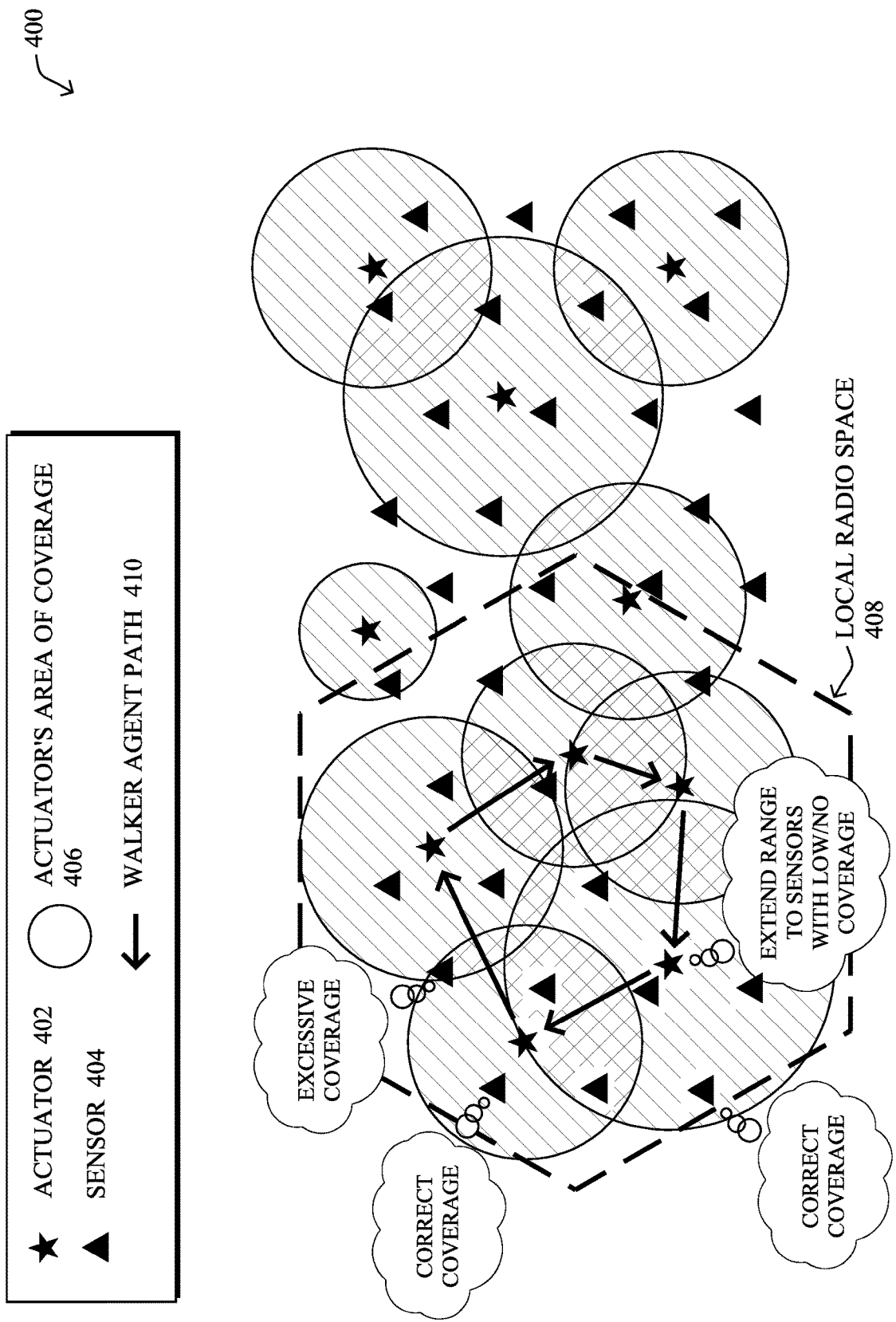

FIG. 4C illustrates an example of a walker agent in operation within network 400. As shown, the walker agent may build a path 410 among actuators 402 through which the agent may "walk." As would be appreciated actuators 402 may be equipped with communication means, such as local radios or hardwired connections, via which actuators 402 may communicate with one another and/or with sensors 404. Note that even in the case of optimizing radio coverage, the devices in a given portion of network 400 may all be within a certain communication range. For example, a given set of actuators 402 may be within local radio scope 408 shown.

When the walker agent determines that a sensor 404 lacks sufficient coverage by an actuator 402, the agent may build a walking path 410 through the nearby actuators 402 within local radio scope 408. The walker agent may identify the actuators 402 for inclusion in path 410 based on their proximity of the sensor 404 that lacks sufficient coverage. For example, the walker agent may use a Global Positioning System (GPS), Received Signal Strength Indicator (RSSI), Time Difference of Arrival (TDOA) information, or the like, to identify the actuators 402 that could potentially provide coverage to the affected sensor 404 or may also require adjustment if the settings of the current actuator 402 are changed.

As noted above, "walking" path 410 may entail the hosting actuator 402 loading and executing the walker agent, to perform its associated functions. Once these functions are complete, the hosting actuator 402 may unload the agent from memory and, in turn, send the agent to another actuator 402 for execution. In doing so, resources of the actuators 402 are only temporarily consumed and do not require permanently hosting the agent.

The walker agent executing on a given actuator 402 may receive sensor measurements from one or more sensors 404. In some embodiments, the hosting actuator 402 may already receive measurements from its nearby sensor(s) 404. However, in other embodiments, the walker agent may spawn child processes and distribute these processes to nearby nodes 404 for execution. In turn, the executing child processes may cause the sensors to report sensor measurements back to the actuator 402 hosting the walker agent.

In one pass of walker agent path 410, the walker agent may identify a sensor 404 that lacks sufficient coverage based on the received sensor measurements. In turn, the walker agent may adjust the actuation setting(s) of the hosting actuator 402, to increase its area of coverage 406, in an attempt to also cover the sensor 404 that lacks sufficient coverage. In some cases, the walker agent may begin by maximizing the areas of coverage 406 of its walked actuators 402 along path 410. In other cases, the walker agent may simply attempt to increase the area of coverage 406 based on measurements from the sensor 404 lacking sufficient coverage.

Figure 4E:
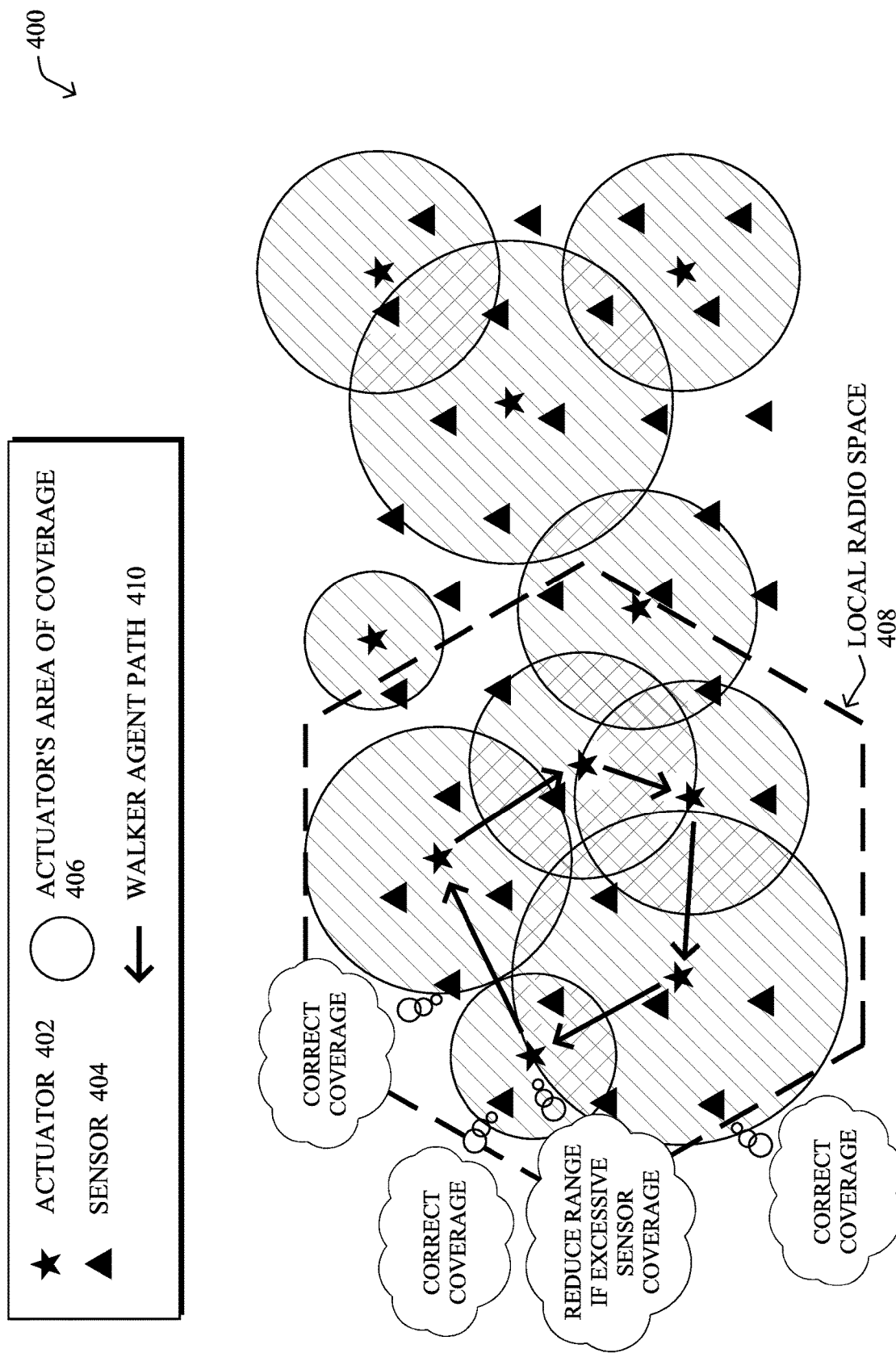

As shown in FIG. 4E, after completing at least one loop of path 410, the walker agent may then attempt to reduce the areas of coverage 406, as needed. For example, by virtue of increasing the area of coverage 406 of one or more actuators 402 along path 410, certain sensors 404 may now experience excessive coverage, which can be problematic in some cases (e.g., excessive watering, etc.). In one example, during this pass, the walker agent may ignore any recently changed actuators 402, to avoid loops. In turn, the agent may identify any sensors 404 that are overly covered and change the actuation setting(s) of the hosting actuator 402, to reduce its area of coverage 406.

Figure 4F:
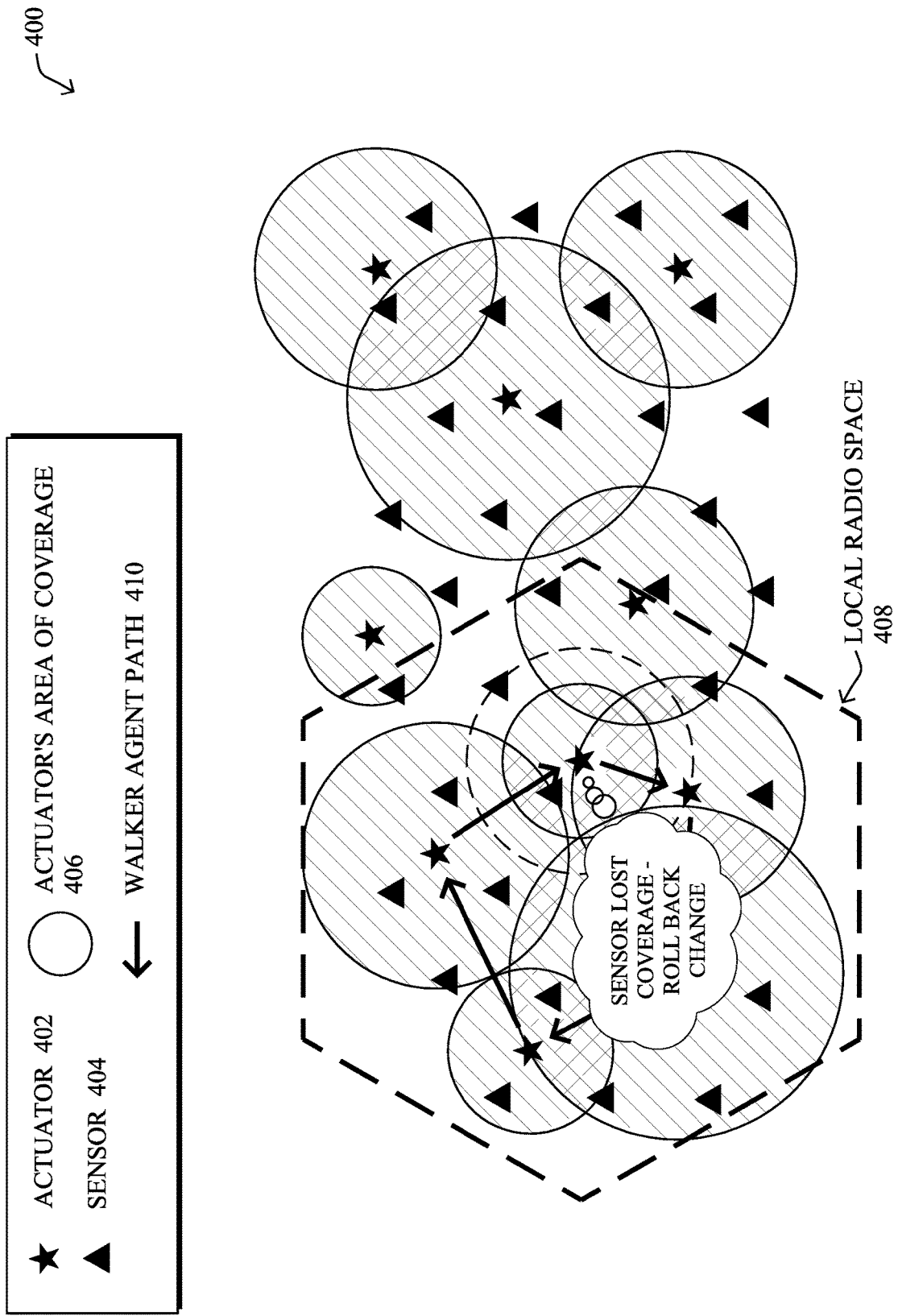

FIG. 4F illustrates an example of an actuator 402 rolling back a setting change to its hosting actuator 402. Note that it may be that in an attempt (trial and error) to reduce an area of coverage 406, the actuator 402 hosting the walker agent may find that one of the sensors 404 that it covers is now running short (e.g., based on the sensor measurements), in which case it needs to roll back this change. In other words, during an iteration around path 410 whereby the walker agent attempts to reduce the area of coverage 406 of its hosting actuator 402, the agent may determine that the change would cause a sensor 402 to lose sufficient coverage. In turn, the agent may return the agent to its prior actuation setting.

Figure 4G:
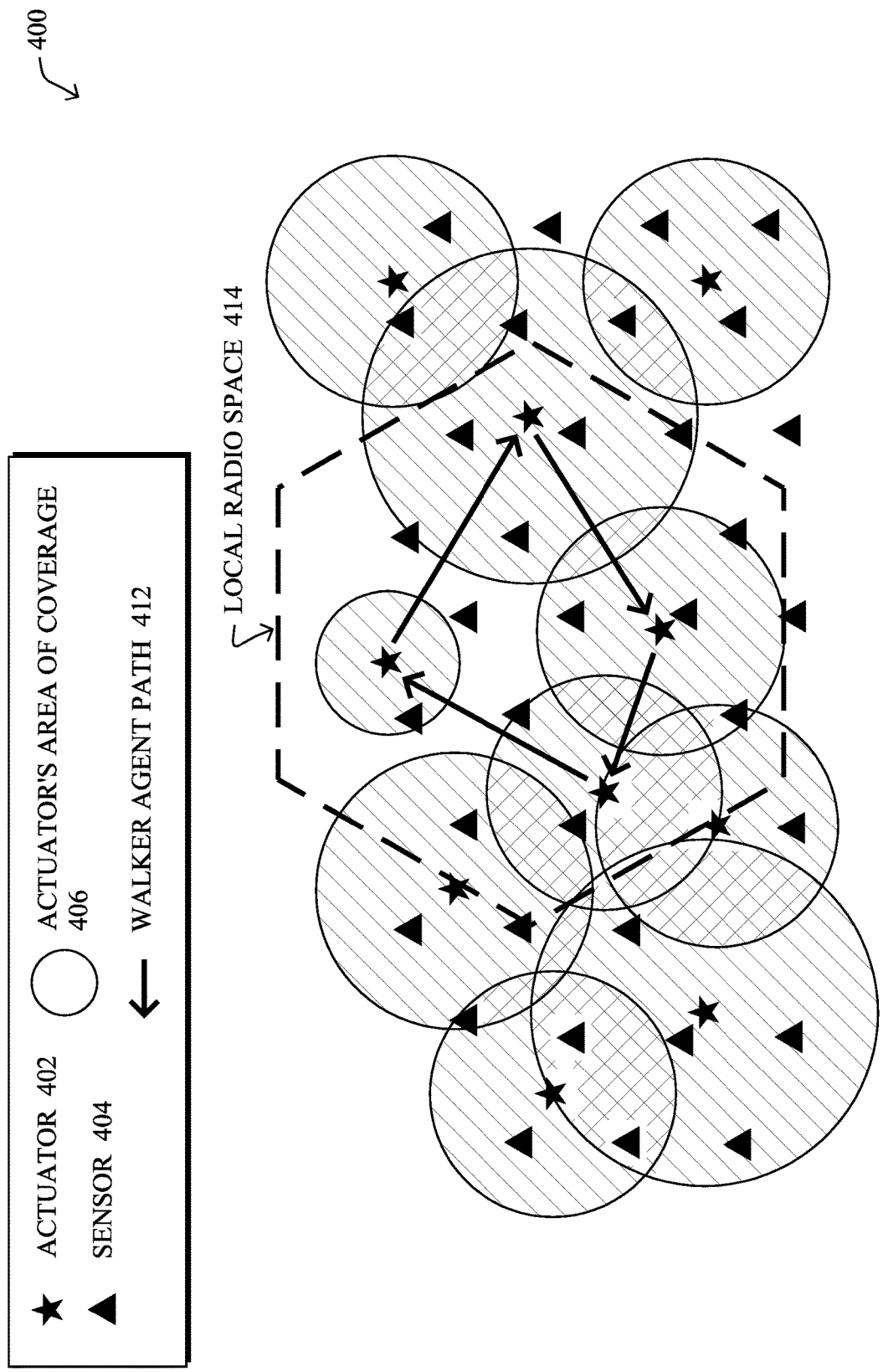

As shown in FIG. 4G, if the walker agent determines that the areas of coverage 406 of the actuators 402 in local radio scope 408 have been optimized, or another stopping criteria is met, the walker agent may "walk" to another portion of network 400 and repeat the above operations. For example, the agent may move to an actuator 402 in the local radio scope 414 shown in FIG. 4G and, in turn, walk through the path 412 shown, to optimize the areas of coverage 406 of the actuators 402 along path 412.

In some embodiments, the walker agent may train a small learning machine (e.g., a machine learning-based optimization model) at each actuator 402 that it visits. Such a learning machine may be used to predict a proper setting change for an actuator 402, based on the sensor measurements and actuation settings previously seen by the agent.

Notably, it may be that the walker agent ends up in another area of network 400 that also requires optimization, such as in the case of FIG. 4G. Based on its experience of tuning a common actuator 402, the learning machine may decide whether current actuator 402 can be tuned within a given range of elasticity, in which case it may readjust slightly another one or more actuators 402 that were already adjusted. It is preferred, by default, that an already modified setting in an actuator 402 should not be changed again so, in a first attempt the agent may ignore the common actuator 402 and changes only the other actuators 402 along the new path 412. In other words, the walker agent may ignore the common actuator 402 that previously existed along path 410 in FIG. 4F.

In more constrained cases, the agent may simply record the actions that it took on its previously visited actuators 402, so as to avoid setting changes that required a roll back to a prior setting. In addition, this recordation can be used to ensure that previously optimized actuators 402 are not changed again.

Note that the coverage optimization by the walker agent may iterate throughout network 400. In order to converge, it is possible to enforce a condition that the actuator has to always narrow down its area of coverage 406 based on previous adjustments, and that the adjustment may only be by a delta of a smaller value than the previous one for a given actuator 402. Several alternative convergence rules may be enforced, e.g., loop detection whereby an adjustment in a loop is detected and an average value is enforced in one actuator 402, letting others adapt.

The walker agent may, thus, circulate through local zones until the whole area of network 400 is covered. When it is done, the agent may complete its optimization, resulting in the optimized coverages shown in FIG. 4H. In some embodiments, if the walker agent is not able to optimize the coverage according to some criteria (e.g., no sensor has excess coverage, etc.), the walker agent may be returned to a supervisory device for further analysis. Similarly, the agent may be sent to the supervisory device for purposes of reporting, further analysis, or deeper optimization. In turn, the supervisory device may use the information learned by the agent, to effect its own optimizations of actuators 402.

Figure 5:
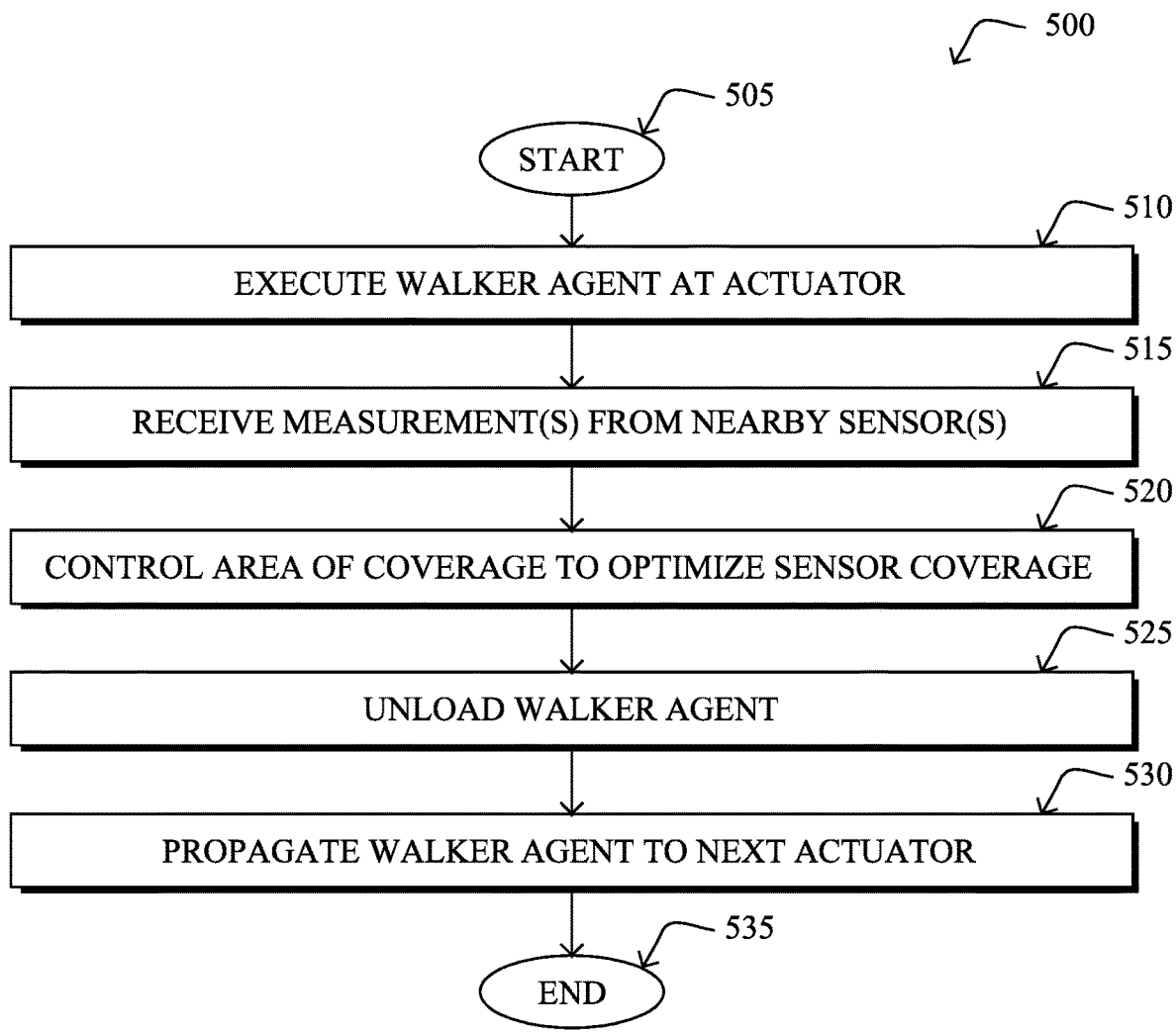
FIG. 5 illustrates an example simplified procedure for optimizing sensor coverage in a network using an actuating walker agent.

FIG. 5 illustrates an example simplified procedure for optimizing sensor coverage in a network using an actuating walker agent in a network in accordance with one or more embodiments described herein. For example, a non-generic, specifically configured device (e.g., device 200) may perform procedure 500 by executing stored instructions (e.g., process 248). For example, in some embodiments, the device may be an actuator in a network that includes a plurality of actuators and sensors. The procedure 500 may start at step 505, and continues to step 510, where, as described in greater detail above, the actuator may execute a walker agent that is configured to adjust an actuation setting of the first actuator. Such an actuation setting may control an area of coverage of the first actuator when actuated (e.g., a power setting, a pressure setting, etc.).

At step 515, as detailed above, the executing walker agent on the actuator may receive sensor measurements from one or more of the sensors that are in communication range of the first actuator. Such information can be used by the agent to identify sensors and determine their current coverage (e.g., insufficient coverage, correct coverage, or excess coverage). In one embodiment, the walker agent may spawn a child process and send the child process to a sensor, to cause the sensor to report back its sensor measurements.

At step 520, the executing walker agent on the actuator may control the area of coverage of its hosting actuator, as described in greater detail above. In particular, based on the received sensor measurements, the agent may adjust the actuation setting of the first actuator, in an attempt to optimize coverage of the sensors in the network by the areas of coverage of the actuators. For example, the agent may increase the area of coverage of the actuator, to cover a sensor that has insufficient coverage. Conversely, the agent may decrease the area of coverage of the actuator, if a sensor has excess coverage (e.g., the sensor is determined to be within the area of coverage of multiple actuators).

At step 525, as detailed above, the actuator may unload the walker agent from memory after adjusting the actuation setting of the host actuator. As would be appreciated, in many implementations, the hosting actuator may have limited resources. Thus, after the walker agent has completed its adjustment of the area of coverage of the actuator, the actuator may unload (e.g., close) the walker agent, thereby freeing up resources on the actuator.

At step 530, the actuator may propagate the walker agent to another one of the actuators in the network for execution, as described in greater detail above. In some cases, the other actuator may lie along a path determined by the walker agent to comprise actuators that may be within range of a sensor that is under covered, within range of a sensor that is over covered, or could be affected by changes to another nearby actuator. In further cases, if the walker agent has completed its optimization task in a portion of the network, the hosting actuator may propagate the agent to another portion of the network, to optimize that portion, as well. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Additionally, the steps of procedure 500 may be repeated any number of times, such as to iteratively optimize the coverage in the network.

The techniques described herein, therefore, allow for coverage optimization in a network, using a walker agent. Doing so not only optimizes sensor coverage by actuators in the network, but does so in a manner that consumes fewer resources, allowing the techniques herein to be used in many types of constrained networks.

While there have been shown and described illustrative embodiments that provide for coverage optimization in a network, it is to be understood that various other adaptations and modifications may be made within the spirit and scope of the embodiments herein. For example, while certain embodiments are described herein with respect to using certain models for purposes of machine learning, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   executing, by a first actuator in a network that comprises a plurality of sensors and actuators, a walker agent configured to adjust an actuation setting of the first actuator, the actuation setting controlling an area of coverage of the first actuator when actuated;

receiving, at the executing walker agent on the first actuator, one or more sensor measurements from one or more of the sensors that are in communication range of the first actuator;

controlling, by the executing walker agent on the first actuator and based on the received one or more sensor measurements, the area of coverage of the first actuator by adjusting the actuation setting of the first actuator to optimize coverage of the sensors in the network;

unloading, by the first actuator, the executing walker agent after adjusting the actuation setting of the first actuator; and propagating, by the first actuator, the walker agent to another one of the actuators in the network for execution, wherein the controlling of the area of coverage of the first actuator comprises:

determining, by the executing walker agent on the first actuator and based on the received sensor measurements, that a particular sensor of the plurality of sensors is within the area of coverage of the first actuator and also within a second area of coverage of a second actuator of the plurality of actuators; and adjusting the actuation setting of the first actuator to decrease the area of coverage of the first actuator so the particular sensor is only within the second area of coverage of the second actuator, such that each of the sensors in the network is within an area of coverage of only a single actuator among the plurality of actuators.

2. The method as in claim 1, wherein controlling the area of coverage of the first actuator by adjusting the actuation setting of the first actuator comprises:

determining, by the executing walker agent on the first actuator and based on the received sensor measurements, that a particular one of the sensors is not in the areas of coverage of the actuators; and adjusting the actuation setting of the first actuator to increase the area of coverage of the first actuator to cover the particular sensor.

3. The method as in claim 1, wherein controlling the area of coverage of the first actuator by adjusting the actuation setting of the first actuator comprises:

training, by the executing walker agent on the first actuator, a machine learning-based optimization model of the agent using the received sensor measurements and the adjusted actuation setting of first actuator.

4. The method as in claim 1, wherein receiving the one or more sensor measurements from the one or more of the sensors that are in communication range of the first actuator comprises:

spawning, by the executing walker agent on the first actuator, one or more child processes; and sending, by the first actuator, the one or more child processes to the one or more sensors, wherein a particular child process is configured to cause a receiving sensor to send sensor measurements to the first actuator when executed by the receiving sensor.

5. The method as in claim 1, further comprising:

determining, by the executing walker agent on the first actuator, that the executing walker agent cannot optimize the coverage of the sensors in the network by the areas of coverage of the actuators; and notifying, by the first actuator, a supervisory device that the walker agent cannot optimize the coverage of the sensors in the network by the areas of coverage of the actuators.

6. The method as in claim 1, further comprising:

receiving, at the first actuator and after propagating the walker agent to the other actuator, the walker agent for execution by the first actuator, wherein the received walker agent has been updated with sensor measurements received by the other actuator.

7. The method as in claim 1, further comprising:

making, by the walker agent executing on the first actuator, a determination that one of the sensors lost coverage by the fields of coverage of the actuators, as a result of the walker agent adjusting the actuation setting of the first actuator; and rolling back, by the walker agent executing on the first actuator, the adjusted actuation setting of the first actuator.

8. The method as in claim 1, wherein propagating, by the first actuator, the walker agent to another one of the actuators in the network for execution comprises:

propagating, by the first actuator, the walker agent to an actuator that is outside of communication range of the first actuator.

9. An apparatus, comprising:

one or more network interfaces to communicate with a network that comprises a plurality of sensors and actuators;

a processor coupled to the network interfaces and configured to execute one or more processes; and a memory configured to store a process executable by the processor, the process when executed configured to:

execute a walker agent configured to adjust an actuation setting of the apparatus, the actuation setting controlling an area of coverage of the apparatus when actuated;

receive, at the executing walker agent, one or more sensor measurements from one or more of the sensors that are in communication range of the apparatus;

control, by the executing walker agent on the apparatus and based on the received one or more sensor measurements, the area of coverage of the apparatus by adjusting the actuation setting of the apparatus to optimize coverage of the sensors in the network;

unload the executing walker agent after adjusting the actuation setting of the apparatus; and propagate the walker agent to one of the actuators in the network for execution, wherein the apparatus controls the area of coverage of the apparatus by adjusting the actuation setting of the apparatus by:

determining, by the executing walker agent on the apparatus and based on the received sensor measurements, that a particular sensor of the plurality of sensors is within the area of coverage of the apparatus and also within a second area of coverage of a second actuator of the plurality of actuators; and adjusting the actuation setting of the apparatus to decrease the area of coverage of the apparatus so the particular sensor is only within the second area of coverage of the second actuator, such that each of the sensors in the network is within an area of coverage of only a single actuator among the plurality of actuators.

10. The apparatus as in claim 9, wherein the apparatus controls the area of coverage of the apparatus by adjusting the actuation setting of the apparatus by:

determining, by the executing walker agent on the apparatus and based on the received sensor measurements, that a particular one of the sensors is not in the areas of coverage of the actuators; and adjusting the actuation setting of the apparatus to increase the area of coverage of the apparatus to cover the particular sensor.

11. The apparatus as in claim 9, wherein the apparatus controls the area of coverage of the apparatus by adjusting the actuation setting of the apparatus by:

training, by the executing walker agent on the apparatus, a machine learning-based optimization model of the agent using the received sensor measurements and the adjusted actuation setting of apparatus.

12. The apparatus as in claim 9, wherein the apparatus receives the one or more sensor measurements from the one or more of the sensors that are in communication range of the apparatus by:

spawning, by the executing walker agent on the apparatus, one or more child processes; and sending the one or more child processes to the one or more sensors, wherein a particular child process is configured to cause a receiving sensor to send sensor measurements to the apparatus when executed by the receiving sensor.

13. The apparatus as in claim 9, wherein the process when executed is further configured to:

determine, by the executing walker agent on the apparatus, that the executing walker agent cannot optimize the coverage of the sensors in the network by the areas of coverage of the actuators; and notify a supervisory device that the walker agent cannot optimize the coverage of the sensors in the network by the areas of coverage of the actuators.

14. The apparatus as in claim 9, wherein the process when executed is further configured to:

receive, after propagating the walker agent to the other actuator, the walker agent for execution by the apparatus, wherein the received walker agent has been updated with sensor measurements received by the other actuator.

15. The apparatus as in claim 9, wherein the process when executed is further configured to:

make, by the walker agent executing on the apparatus, a determination that one of the sensors lost coverage by the fields of coverage of the actuators, as a result of the walker agent adjusting the actuation setting of the apparatus; and roll back, by the walker agent executing on the apparatus, the adjusted actuation setting of the apparatus.

16. The apparatus as in claim 9, wherein the apparatus propagates the walker agent to another one of the actuators in the network for execution by:

propagating the walker agent to an actuator that is outside of communication range of the apparatus.

17. A tangible, non-transitory, computer-readable medium storing program instructions that cause a first actuator in a network that comprises a plurality of sensors and actuators to execute a process comprising:

executing, by the first actuator, a walker agent configured to adjust an actuation setting of the first actuator, the actuation setting controlling an area of coverage of the first actuator when actuated;

receiving, at the executing walker agent on the first actuator, one or more sensor measurements from one or more of the sensors that are in communication range of the first actuator;

controlling, by the executing walker agent on the first actuator and based on the received one or more sensor measurements, the area of coverage of the first actuator by adjusting the actuation setting of the first actuator to optimize coverage of the sensors in the network;

unloading, by the first actuator, the executing walker agent after adjusting the actuation setting of the first actuator; and propagating, by the first actuator, the walker agent to another one of the actuators in the network for execution, wherein the controlling of the area of coverage of the first actuator comprises:

determining, by the executing walker agent on the first actuator and based on the received sensor measurements, that a particular sensor of the plurality of sensors is within the area of coverage of the first actuator and also within a second area of coverage of a second actuator of the plurality of actuators; and adjusting the actuation setting of the first actuator to decrease the area of coverage of the first actuator so the particular sensor is only within the second area of coverage of the second actuator, such that each of the sensors in the network is within an area of coverage of only a single actuator among the plurality of actuators.

18. The computer-readable medium as in claim 17, wherein receiving the one or more sensor measurements from the one or more of the sensors that are in communication range of the first actuator comprises:

spawning, by the executing walker agent on the first actuator, one or more child processes; and sending, by the first actuator, the one or more child processes to the one or more sensors, wherein a particular child process is configured to cause a receiving sensor to send sensor measurements to the first actuator when executed by the receiving sensor.

* * * * *